United States Patent [19]

Pfeiffer et al.

[11] Patent Number: 5,119,672
[45] Date of Patent: Jun. 9, 1992

[54] AIR FLOW RATE METER

[75] Inventors: Martin Pfeiffer, Fellbach-Schmiden; Thomas Schwegel, Ditzingen-Heimerdingen, both of Fed. Rep. of Germany

[73] Assignee: Robert Bosch GmbH, Stuttgart, Fed. Rep. of Germany

[21] Appl. No.: 645,319

[22] Filed: Jan. 24, 1991

Related U.S. Application Data

[63] Continuation of Ser. No. 508,632, Apr. 13, 1990, abandoned.

Foreign Application Priority Data

Jul. 8, 1989 [DE] Fed. Rep. of Germany ....... 3922488

[51] Int. Cl.⁵ .......................................... G01M 15/00
[52] U.S. Cl. .................................................. 73/118.2
[58] Field of Search ................... 73/118.2, 202, 202.5, 73/203

[56] References Cited

U.S. PATENT DOCUMENTS

| | | | |
|---|---|---|---|
| 4,515,014 | 5/1985 | Sumal | 73/202.5 |
| 4,624,134 | 11/1986 | Nagano | 73/118.2 |
| 4,887,577 | 12/1989 | Arai et al. | 73/118.2 |

FOREIGN PATENT DOCUMENTS

| | | | |
|---|---|---|---|
| 0054887 | 9/1988 | European Pat. Off. | |
| 0208413 | 12/1982 | Japan | 73/202.5 |
| 0065217 | 4/1984 | Japan | 73/118.2 |

Primary Examiner—Robert Raevis
Attorney, Agent, or Firm—Edwin E. Greigg; Ronald E. Greigg

[57] ABSTRACT

An air flow rate meter, in particular for measuring the mass of air aspirated by an internal combustion engine, has a main flow conduit with a venturi-like flow portion and a bypass conduit, which discharges with an inlet and outlet opening above and below the venturi-like flow portion, respectively. A temperature-dependent measuring resistor is disposed in the bypass conduit. To avoid impairment of the measured value signal by an increase in the noise component caused by turbulence of the air upstream of the venturi-like flow portion, which unavoidably occurs upon deflection of the air flow direction, the inlet opening of the bypass conduit is shifted in the flow direction upstream of the deflection of the air flow, into a region of quasi-laminar flow with a constant pressure profile.

20 Claims, 2 Drawing Sheets

AIR FLOW RATE METER

This is a continuation of application Ser. No. 508,632, filed on Apr. 13, 1990, now abandoned.

BACKGROUND OF THE INVENTION

The invention is directed to improvements in air flow rate meters for internal combustion engines.

In a known air flow rate meter of this type (European Patent Document 0 054 887 C2), the inlet portion of the bypass conduit located upstream in the flow direction is embodied by a small tube that protrudes beyond the venturi portion of the main flow conduit and at its free end forms the entry opening for the bypass conduit. The length of the small tube is at a predetermined ratio to the inside diameter of the bypass conduit. By means of this small tube, an attempt is made to reduce the disadvantageous influence of turbulence at the upstream end of the bypass conduit on the measured value signal of the temperature-dependent resistor. To reinforce this effect, a flow straightening blade is used.

Upon deflection of the air flow direction upstream of the bypass conduit, for instance by 90°, as is often the case in air intake systems of internal combustion engines for reasons having to do with installation conditions, increased turbulence and a shift of the pressure profile causes markedly increased signal noise, which can no longer be adequately eliminated even with the flow straightening blade in the entry area of the bypass conduit.

OBJECT AND SUMMARY OF THE INVENTION

It is a principal object of the air flow rate meter according to the invention that for such cases of flow deflection upstream of the bypass conduit, the noise component in the measured value signal is reduced considerably in accordance with the invention by shifting the bypass opening out of the disturbance zone into the region of largely laminar flow, where there is an approximately constant pressure profile over the flow cross section.

The invention will be better understood and further objects and advantages thereof will become more apparent from the ensuing detailed description of a preferred embodiment taken in conjunction with the drawing.

DESCRIPTION OF THE PREFERRED EMBODIMENT

Figure 1:
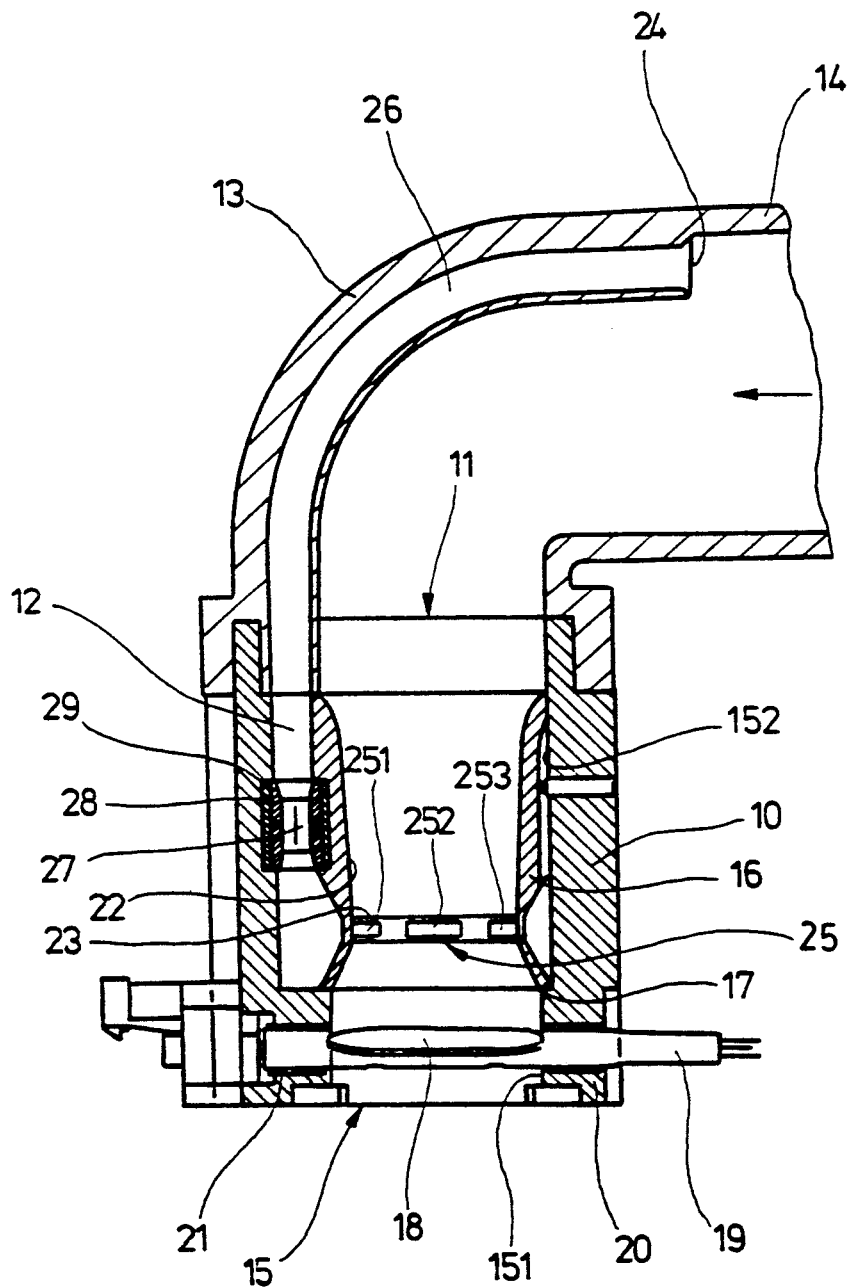
FIG. 1 of the drawings is a longitudinal section through an air flow rate meter for an intake system of an internal combustion engine.
Figure 2:
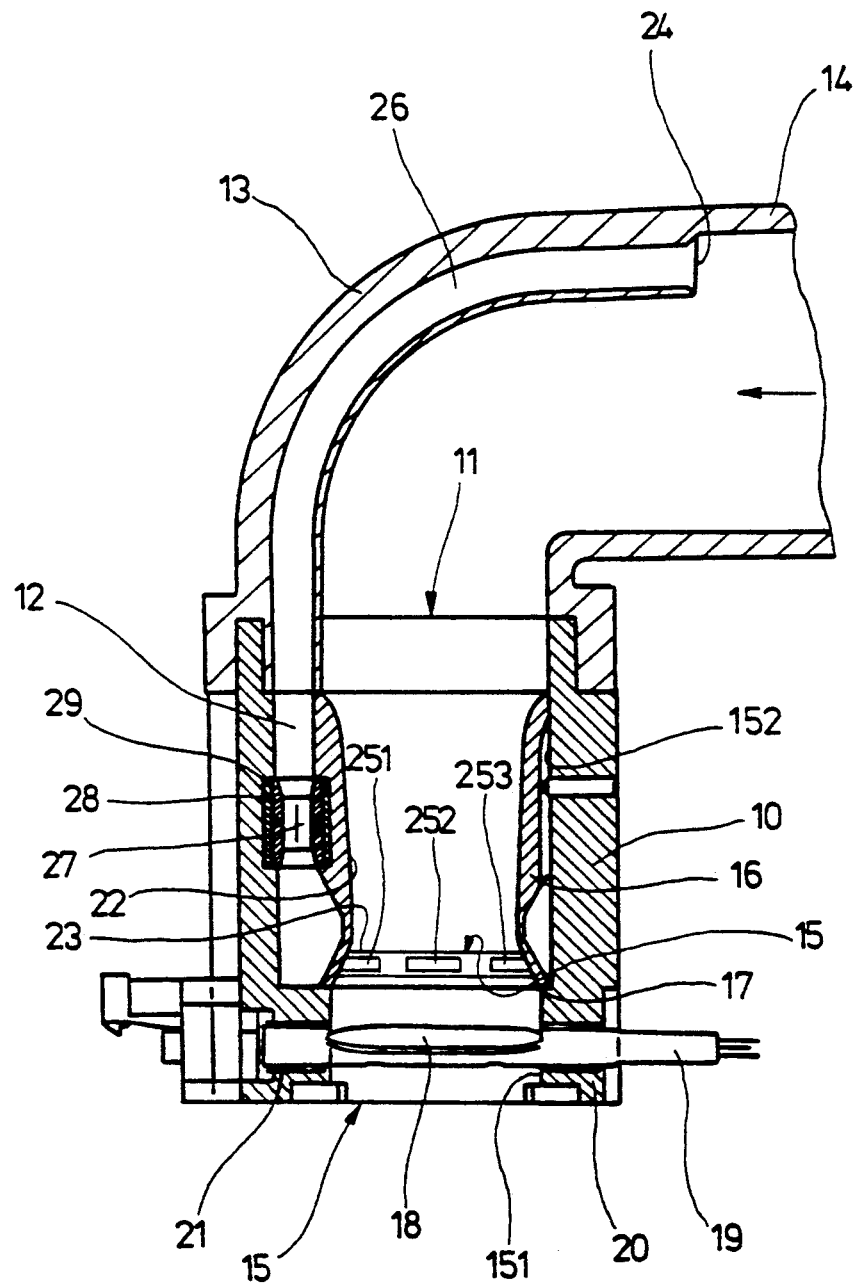
FIG. 2 is a longitudinal section of a modification of the air flow rate meter shown in FIG. 1.

In the air flow rate meter shown in longitudinal section in the drawing, there is a so-called throttle valve neck 10, in which a main flow conduit 11 and a bypass conduit 12 are formed. The throttle valve neck 10 is attached to an elbow 13 which is integral with an air intake tube 14 of an internal combustion engine. On the outlet side, the throttle valve neck 10 is secured to a manifold intake tube, not shown here, of the engine.

In order to form the main flow conduit 11 and bypass conduit 12, a through bore 15 is formed in the throttle valve neck 10, composed of two bores 151, 152 in axial succession and disposed eccentrically relative to one another. The bore 152 toward the inlet side has a larger diameter than the bore 151 toward the outlet side. A flow sleeve 16 is inserted into the bore 152, supported at the face end on a stop face 17 at the transition between the two bores 151, 152 and retained undisplaceably in both the axial and radial directions. The bore 151 and the flow sleeve 16 coaxial with it, which is smaller in diameter than the inside diameter of the bore 152, together form the main flow conduit 11, while the outer jacket of the flow sleeve 16 and the wall of the bore 152 define the bypass conduit 12. A throttle valve 18 that is secured on a control shaft 19 is disposed in the main flow conduit 11 in the vicinity of the bore 151. The control shaft 19 is pivotably supported at bearing points 20, 21 in the throttle valve neck 10. The inner wall of the flow sleeve 16 is embodied as a venturi and forms a venturi-like flow portion in the main flow conduit 11, hereinafter called the venturi portion 22. The venturi portion 22 has its smallest flow cross section 23 near the end oriented toward the bore 151 and widens toward the inlet side of the throttle valve neck 10.

The bypass conduit 12 embodied in the throttle valve neck 10 has an inlet opening 24, located upstream of the venturi portion 22, and an outlet opening 25 located downstream, in or under the smallest flow cross section 23 of the venturi portion 22. The outlet opening 25 is made up of a plurality of openings 251-253 in the flow sleeve 16, which are distributed over the circumference of the flow sleeve 16. The inlet opening 24 of the bypass conduit 12 is located upstream of the 90° elbow 13 in the vicinity of the straight portion of the air intake tube 14. To this end, a separate air guide conduit 26 is embodied on the inner wall of the elbow 13, its inside cross section being approximately equivalent to that of the bypass conduit 12 in the throttle valve neck 10. With the throttle valve neck 10 mounted on the elbow 13, the ends of the air guide conduit 26 and bypass conduit 12 present in the throttle valve neck 10 rest on one another, coinciding exactly. The air guide conduit 26 extending from the inlet to the outlet of the elbow 13 may be embodied integrally with the elbow 13 or secured on it as a separate Component.

A temperature-dependent measuring resistor 27, embodied as a hot wire or hot film, is disposed in the bypass conduit 12. The measuring resistor 27 is located inside an insert 28, which in turn is inserted into a carrier body 29. The carrier body 29 is fastened between the flow sleeve 16 and the inner wall of the throttle valve neck 10. The temperature-dependent measuring resistor 27 varies its electrical resistance as a function of the variation in the airflow in the bypass conduit 12. The electrical output signal of the measuring resistor 27 is thus a standard for the air throughput in the main flow conduit 11.

Because of the flow deflection by approximately 90° in the elbow 13, eddies and turbulence in the air flow occur in the region upstream of the venturi portion 22. Moreover, the pressure profile shifts; a zone of dammed up pressure is located near the elbow wall having the larger radius of curvature, and a negative pressure zone forms on the opposite wall of the elbow. As a result of the separate air guide conduit 26 in the elbow 13, the inlet opening 24 of the bypass conduit 12 is shifted away from that region, so that these turbulent flows cannot extend to inside the bypass conduit 12 and do not lead to an increase in the noise component in the measured value signal of the measuring resistor 27.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An air flow rate meter, for measuring a mass of air aspirated by an internal combustion engine, having a main air flow conduit having an inlet portion with an inlet end and an outlet portion with an outlet end, said main flow conduit provided with a venturi-like flow portion between said inlet end and said outlet end, further having a bypass conduit including an inlet opening (24) and at least one outlet opening (25), said bypass conduit extends along an inside portion of said main air flow conduit and discharges via said at least one outlet opening into an air flow through said venturi-like flow portion, said at least one outlet opening being disposed in a narrowest cross section of the venturi-like flow portion, a temperature-dependent measuring resistor disposed in said bypass conduit, said inlet portion of said main flow conduit includes an area for deflection of the air flow direction which is embodied in an elbow-shaped portion, and the inlet opening (24) of the bypass conduit (12) is in an area upstream of the area for deflection of the air flow detection but downstream of the inlet end of the main air flow conduit to a region of quasi-laminar flow having a substantially constant pressure profile.

2. An air flow rate meter as defined by claim 1, in which the main flow conduit and the bypass conduit are integrated in a connection neck which is connected to said elbow-shaped portion of said air flow conduit, said air flow conduit forming a curvature having an angle of less than or equal to 90° with respect to said connection neck, and the inlet opening of the bypass conduit is located in the air flow conduit upstream of the inlet opening to said connection neck.

3. An air flow rate meter as defined by claim 2, in which the bypass conduit is assembled rom conduit portions that are connected at the connection neck and the elbow-shaped portion of the air flow conduit.

4. An air flow rate meter as set forth in claim 3 in which said bypass conduit is integral with said air flow conduit.

5. An air flow rate meter as defined by claim 1, in which one end of the elbow-shaped portion of said air flow conduit forms a part of a connection neck.

6. An air flow rate meter as defined by claim 5, in which the bypass conduit is assembled from conduit portions that are connected at the connection neck and elbow-shaped portion of the air flow conduit.

7. An air flow rate meter as set forth in claim 6 in which said bypass conduit is integral with said air flow conduit.

8. An air flow rate meter as defined by claim 1, in which one end of the elbow-shaped portion of the air flow conduit forms part of an air guide tube connectable with a connection neck.

9. An air flow rate meter as defined by claim 8, in which the bypass conduit is assembled from conduit portions that are connected at the connection neck and elbow-shaped portion of the air flow conduit.

10. An air flow rate meter as set forth in claim 9 in which said bypass conduit is integral with said air flow conduit.

11. An air flow rate meter, for measuring a mass of air aspirated by an internal combustion engine via an air intake tube (14) including an elbow-shaped portion (13), having a main flow conduit (11) having an inlet portion with an inlet end and an outlet portion with an outlet end and provided with a venturi-like flow portion and further having a bypass conduit (12, 26) including an inlet opening (24) and at least one outlet opening (25), said bypass conduit extending along an inside portion of said main air flow conduit and said elbow-shaped portion of said air intake tube, said bypass conduit discharges via said at least one outlet opening (25) into an air flow through the venturi-like flow portion, said at least one outlet opening (25) of said bypass conduit being disposed below a narrowest cross section of the venturi-like flow portion, a temperature-dependent measuring resistor disposed in said bypass conduit, said air intake tube (14) having an air inlet portion and downstream thereof said elbow-shaped portion (13) with an area of air deflection between an inlet opening of the elbow-shaped portion and an outlet opening of the elbow-shaped portion, said inlet portion of said main flow conduit (11) is further connected with the outlet opening of said elbow-shaped portion, and said inlet opening (24) of the bypass conduit is disposed in an area of said elbow-shaped portion between said air inlet portion of said air intake tube and the area of deflection of the elbow-shaped portion in a region of quasi-laminar flow having a substantially constant pressure profile.

12. An air flow rate meter as defined by claim 11, in which the main flow conduit and the bypass conduit are integrated in a connection neck which is connected to a substantially elbow-shaped portion of an air flow conduit, said air flow conduit forming a curvature having an angle of less than or equal to 90° with respect to said connection neck and the inlet opening of the bypass conduit is located in the air flow conduit upstream of the curvature and upstream of the inlet opening of said connection neck.

13. An air flow rate meter as defined by claim 12, in which the bypass conduit is assembled from conduit portions that are connected at the connection neck and elbow-shaped portion of the air flow conduit.

14. An air flow rate meter as set forth in claim 13 in which said bypass conduit is integral with said air flow conduit.

15. An air flow rate meter as defined by claim 11, in which one end of the elbow-shaped portion of the air flow conduit forms part of a connection neck.

16. An air flow rate meter as defined by claim 15, in which the elbow-shaped portion of the air flow conduit forms part of an air guide tube connectable with the connection neck.

17. An air flow rate meter as defined by claim 16, in which the bypass conduit is assembled from conduit portions that are connected at the connection neck and the elbow-shaped portion of the air flow conduit.

18. An air flow rate meter as set forth in claim 17 in which said bypass conduit is integral with said air flow conduit.

19. An air flow rate meter as defined by claim 15, in which the bypass conduit is assembled from conduit portions that are connected at the connection neck and elbow-shaped portion of the air flow conduit.

20. An air flow rate meter as set forth in claim 19 in which said bypass conduit is integral with said air flow conduit.

* * * * *